(12) United States Patent
Ghosh et al.

(10) Patent No.: US 9,064,009 B2
(45) Date of Patent: Jun. 23, 2015

(54) ATTRIBUTE CLOUD

(75) Inventors: Riddhiman Ghosh, Sunnyvale, CA (US); Maria G Castellanos, Sunnyvale, CA (US); Meichun Hsu, Los Altos Hills, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 433 days.

(21) Appl. No.: 13/432,639

(22) Filed: Mar. 28, 2012

(65) Prior Publication Data

US 2013/0259362 A1   Oct. 3, 2013

(51) Int. Cl.
G06K 9/00     (2006.01)
G06F 17/30    (2006.01)

(52) U.S. Cl.
CPC .............. G06F 17/30716 (2013.01)

(58) Field of Classification Search
CPC ............ G06F 17/30716; G06F 17/27; G06F 17/2765; G06F 17/2785; G06F 17/30707
USPC ......... 382/162, 286, 164, 165, 170, 171, 173, 382/278; 704/8, 9, E17, 10, 4, 1, 6, 7; 715/256; 707/103, 10, E17.03, 805
See application file for complete search history.

(56) References Cited

U.S. PATENT DOCUMENTS

| 3,487,308 | A |   | 12/1969 | Johnson |
|---|---|---|---|---|
| 4,849,898 | A | * | 7/1989 | Adi ..................................... 1/1 |
| 5,101,349 | A | * | 3/1992 | Tokuume et al. .................. 704/9 |
| 5,581,797 | A |   | 12/1996 | Baker |
| 5,608,904 | A |   | 3/1997 | Chaudhuri et al. |
| 5,623,590 | A |   | 4/1997 | Becker et al. |
| 5,623,598 | A |   | 4/1997 | Voigt et al. |
| 5,634,133 | A |   | 5/1997 | Kelley |
| 5,659,768 | A |   | 8/1997 | Forbes et al. |
| 5,694,591 | A |   | 12/1997 | Du et al. |
| 5,757,356 | A |   | 5/1998 | Takasaki et al. |
| 5,801,688 | A |   | 9/1998 | Mead et al. |
| 5,878,206 | A | * | 3/1999 | Chen et al. ..................... 714/19 |
| 5,903,891 | A |   | 5/1999 | Chen et al. |
| 5,924,103 | A |   | 7/1999 | Ahmed et al. |
| 5,929,863 | A |   | 7/1999 | Tabei et al. |
| 5,940,839 | A |   | 8/1999 | Chen et al. |
| 5,986,673 | A |   | 11/1999 | Martz |

(Continued)

FOREIGN PATENT DOCUMENTS

EP          0778001        11/1997
WO      WO-2012167399     12/2012

OTHER PUBLICATIONS

Chang Liul et al., "Class-based Semantic Cohesion Computation", 2003 IEEE., pp. 1673-1678.*

(Continued)

*Primary Examiner* — Mekonen Bekele
(74) *Attorney, Agent, or Firm* — Hewlett-Packard Patent Department

(57) ABSTRACT

An example system includes at least one memory and at least one processing device. The at least one memory comprises instructions that when executed by the at least one processing device cause the system to receive a text corpus, filter the text corpus to obtain a plurality of attributes, determine the semantic cohesion between the plurality of attributes, and create an attribute cloud including the plurality of attributes, where the placement of the plurality of attributes within the attribute cloud is based at least in part on the determined semantic cohesion between the plurality of attributes.

20 Claims, 6 Drawing Sheets

(56) References Cited

U.S. PATENT DOCUMENTS

| | | | |
|---|---|---|---|
| 5,999,193 | A | 12/1999 | Conley, Jr. et al. |
| 6,052,890 | A | 4/2000 | Malagrino, Jr. et al. |
| 6,144,379 | A | 11/2000 | Bertram et al. |
| 6,161,084 | A * | 12/2000 | Messerly et al. ............ 704/9 |
| 6,211,880 | B1 | 4/2001 | Impink, Jr. |
| 6,211,887 | B1 | 4/2001 | Meier et al. |
| 6,269,325 | B1 | 7/2001 | Lee et al. |
| 6,400,366 | B1 | 6/2002 | Davies et al. |
| 6,429,868 | B1 | 8/2002 | Dehner, Jr. et al. |
| 6,466,946 | B1 | 10/2002 | Mishra et al. |
| 6,466,948 | B1 | 10/2002 | Levitsky et al. |
| 6,502,091 | B1 | 12/2002 | Chundi et al. |
| 6,584,433 | B1 | 6/2003 | Zhang et al. |
| 6,590,577 | B1 | 7/2003 | Yonts |
| 6,603,477 | B1 | 8/2003 | Tittle |
| 6,658,358 | B2 | 12/2003 | Hao et al. |
| 6,684,206 | B2 | 1/2004 | Chen et al. |
| 6,724,933 | B1 * | 4/2004 | Lin et al. ............ 382/164 |
| 6,727,926 | B1 | 4/2004 | Utsuki et al. |
| 6,934,578 | B2 | 8/2005 | Ramseth |
| 7,020,869 | B2 | 3/2006 | Abari et al. |
| 7,202,868 | B2 | 4/2007 | Hao |
| 7,221,474 | B2 | 5/2007 | Hao et al. |
| 7,313,533 | B2 | 12/2007 | Chang et al. |
| 7,542,882 | B2 | 6/2009 | Agrawala et al. |
| 7,567,250 | B2 | 7/2009 | Hao et al. |
| 7,714,876 | B1 | 5/2010 | Hao |
| 7,924,283 | B1 | 4/2011 | Hao |
| 7,930,302 | B2 | 4/2011 | Bandaru et al. |
| 7,974,983 | B2 | 7/2011 | Goeldi |
| 8,005,613 | B2 | 8/2011 | Rasmussen et al. |
| 8,078,641 | B2 | 12/2011 | Mao et al. |
| 8,151,194 | B1 | 4/2012 | Chan et al. |
| 8,265,925 | B2 * | 9/2012 | Aarskog ............ 704/9 |
| 8,281,238 | B2 * | 10/2012 | Sweeney et al. ............ 715/273 |
| 8,595,151 | B2 | 11/2013 | Hao |
| 2002/0002458 | A1 * | 1/2002 | Owen et al. ............ 704/260 |
| 2002/0118193 | A1 | 8/2002 | Halstead |
| 2003/0065546 | A1 | 4/2003 | Goruer et al. |
| 2003/0071815 | A1 | 4/2003 | Hao et al. |
| 2003/0128212 | A1 | 7/2003 | Pitkow |
| 2003/0221005 | A1 | 11/2003 | Betge-Brezetz et al. |
| 2004/0051721 | A1 | 3/2004 | Ramseth |
| 2004/0054294 | A1 | 3/2004 | Ramseth |
| 2004/0054295 | A1 | 3/2004 | Ramseth |
| 2004/0201588 | A1 | 10/2004 | Meanor |
| 2004/0210540 | A1 | 10/2004 | Israel et al. |
| 2005/0066026 | A1 | 3/2005 | Chen et al. |
| 2005/0119932 | A1 | 6/2005 | Hao |
| 2005/0219262 | A1 | 10/2005 | Hao et al. |
| 2006/0095858 | A1 | 5/2006 | Hao et al. |
| 2006/0136491 | A1 * | 6/2006 | Berkner et al. ............ 707/103 R |
| 2007/0225986 | A1 | 9/2007 | Bowe, Jr. et al. |
| 2007/0244690 | A1 * | 10/2007 | Peters ............ 704/8 |
| 2008/0059452 | A1 | 3/2008 | Frank |
| 2008/0134141 | A1 * | 6/2008 | Geisinger ............ 717/107 |
| 2008/0172623 | A1 * | 7/2008 | Roche et al. ............ 715/762 |
| 2008/0172647 | A1 * | 7/2008 | Roche et al. ............ 717/100 |
| 2009/0033664 | A1 | 2/2009 | Hao et al. |
| 2009/0063472 | A1 * | 3/2009 | Pell et al. ............ 707/5 |
| 2009/0079766 | A1 | 3/2009 | Dolph et al. |
| 2009/0319518 | A1 | 12/2009 | Koudas et al. |
| 2010/0050118 | A1 * | 2/2010 | Chowdhury et al. ............ 715/810 |
| 2010/0318291 | A1 | 12/2010 | Gluck et al. |
| 2011/0012773 | A1 | 1/2011 | Cunning et al. |
| 2011/0113386 | A1 * | 5/2011 | Sweeney et al. ............ 715/853 |
| 2011/0191014 | A1 | 8/2011 | Feng et al. |
| 2011/0282919 | A1 * | 11/2011 | Sweeney et al. ............ 707/805 |
| 2012/0005045 | A1 | 1/2012 | Baker |
| 2012/0079372 | A1 * | 3/2012 | Kandekar et al. ............ 715/256 |
| 2012/0150972 | A1 | 6/2012 | Morris et al. |
| 2012/0197903 | A1 | 8/2012 | Lu |
| 2013/0194272 | A1 | 8/2013 | Hao et al. |
| 2013/0257903 | A1 | 10/2013 | Hao |
| 2014/0344243 | A1 * | 11/2014 | Hao et al. ............ 707/710 |

OTHER PUBLICATIONS

AC Jobbins, LJ Evett, "Automatic identification of cohesion in texts: Exploiting the lexical organisation of Roget's Thesaurus", pp. 17.*

Hugo Jair Escalante Balderas, "Semantic Cohesion for Image Annotation and Retrieval", PhD Thesis, year 2010, pp. 18.*

Castellanos; Malu, et al.; "Livepulse: Tapping Social Media for Sentiments in Real-Time"; Hewlett-Packard Laboratories; Mar. 28-Apr. 1, 2011; 4 pages.

Castellanos, Maul, et al.; "LCI: A Social Channel Analysis Platform for Live Customer Intelligence"; Jun. 2011 9 pages.

Grivas, S.G. et al.; "CloudBased EventProcessing Architecture for Opinion Mining"; Jul. 2011; 9 pages.

Guerra, P.H.C. et al.; "From Bias to Opinion; a Transfer-learning Approach to Real-time Sentiment Analysis": Sep. 14, 2011; pp. 150-158.

B. Shneiderman, "Tree Visualization with Treemaps: a 2-D Space-Filling Approach", pp. 1-10, Jun. 1991.

Chris Stolte et al., "Polaris: A System for Query, Analysis and Visualiztion of Multidimensional Relational Databases," IEEE Transactions on Visualization and ComputerGraphics, vol. 8, No. 1, pp. 1-14 (Jan.-Mar. 2002).

D. Keim et al Pixel Bar Charts: A New Technique for Visualization Large Multi-Attribute Data Sets with Aggregation: HP Technical Report, Apr. 2001, pp. 1-10.

Daniel A. Keim et al., "VisDB: Database Exploration Using Multi-dimensional Visualization," IEEE Graphics and Applications, vol. 14, No. 5, pp. 40-49 (1994).

Daniel Keim et al "Designing Pixel-Orientated Visualization Techniques: Theory and Applications" IEEE Transactions on Visualization and Computer Graphics, vol. 6, No. 1, Jan.-Mar. 2000, pp. 59-78.

Deun et al., Multidimensional Scaling, Open and Distance Learning, Jan. 12, 2000 (pp. 1-16).

Eamonn Keogh, Harry Hochheiser, and Ben Shneiderman; An Augmented Visual Query Mechanism for Finding Patterns in Time Series Data; 2002; Lecture Notes in Computer Science, Proceedings of the 5th International Conference on Flexible Query Answering Systems; Springer-Verlag; vol. 252212002; pp. 240-250.

H. Hochheiser et al., "Dynamic Query Tools for Time Series Data Sets: Timebox Widgets for Interactive Exploration," Information Visualization, vol. 3, pp. 1-18 (2004.

http://www.pavis.org/essay/multidimensional_scaling.html, 2001 Wojciech Basalaj, (pp. 1-30).

J. Fekete et al., "Interactive Information Visualization of a Million Items," Information Visualization, 2002, INFOVIS 2002, IEEE Symposium, Published Oct. 2002, pp. 1-8.

J. Yang et al., "Visual Hierarchical Dimension Reduction for Exploration of High Dimensional Datasets," Joint Eurographics/IEEE TCVG Symposium on Visualization, pp. 19-28 (May 2003).

Jessica Lin, Eamonn Keogh, Stefano Lonardi, Jeffrey P. Lankford, Donna M. Nystrom; Visually Mining and Monitoring Massive Time Series; 2004; International Conference on Knowledge Discovery and Data Mining archive, Proceedings of the tenth ACM SIGKDD international conference on Knowledge discovery and data mining table of contents; pp. 460-469.

M. Ankerst et al "Towards an effective cooperation of the computer and the computer user for classification, Proc. 6th Int. Conf. on Knowledge Discovery and Data Mining ," (KDD'2000), Aug. 20-23, 2000, Boston, MA, 2000, pp. 1-10.

M.C. Hao et al "Visual Mining of E-customer Behavior Using Pixel Bar Charts,", HP Technical Report, Jun. 20, 2001, pp. 1-7.

Matthew O. Ward, "XmdvTool: Integrating Multiple Methods for Visualizing Multivariate Data," Proc. Visualization, pp. 326-331 (Oct. 1994).

P. Buono et al., "Technical Research Report, Interactive Pattern Search in Time Series," Institute for Systems Research, TR 2005-57, pp. 1-11 (2004).

* cited by examiner

ATTRIBUTE CLOUD

BACKGROUND

The proliferation of the Internet has made it quite easy for a web user to express his or her opinion to large audiences about products, services, people, events, places, and the like. This expression is typically accomplished via social media websites (e.g., Facebook™ and Twitter™), product review websites (e.g., Yelp™ and CNET™), company websites (e.g., Amazon™), forums, blogs, articles, and surveys. Regardless of the tool utilized, the user's opinion often has a long-lasting impact because readers tend to give significant weight to other's opinions when judging a product, service, person, event, or place. The user's opinion, therefore, can tip the scales when the reader is selecting a product to purchase, selecting a candidate to elect, selecting an event to attend, or selecting a service to utilize. As a result of this realization, companies, campaigns, and advertisers have become more focused on user-generated online content, and are particularly interested in extracting what is being said about their products and services, or what is being said about their competitor's products and services.

BRIEF DESCRIPTION OF THE DRAWINGS

Example embodiments are described in the following detailed description and in reference to the drawings, in which.

DETAILED DESCRIPTION

Figure 1:
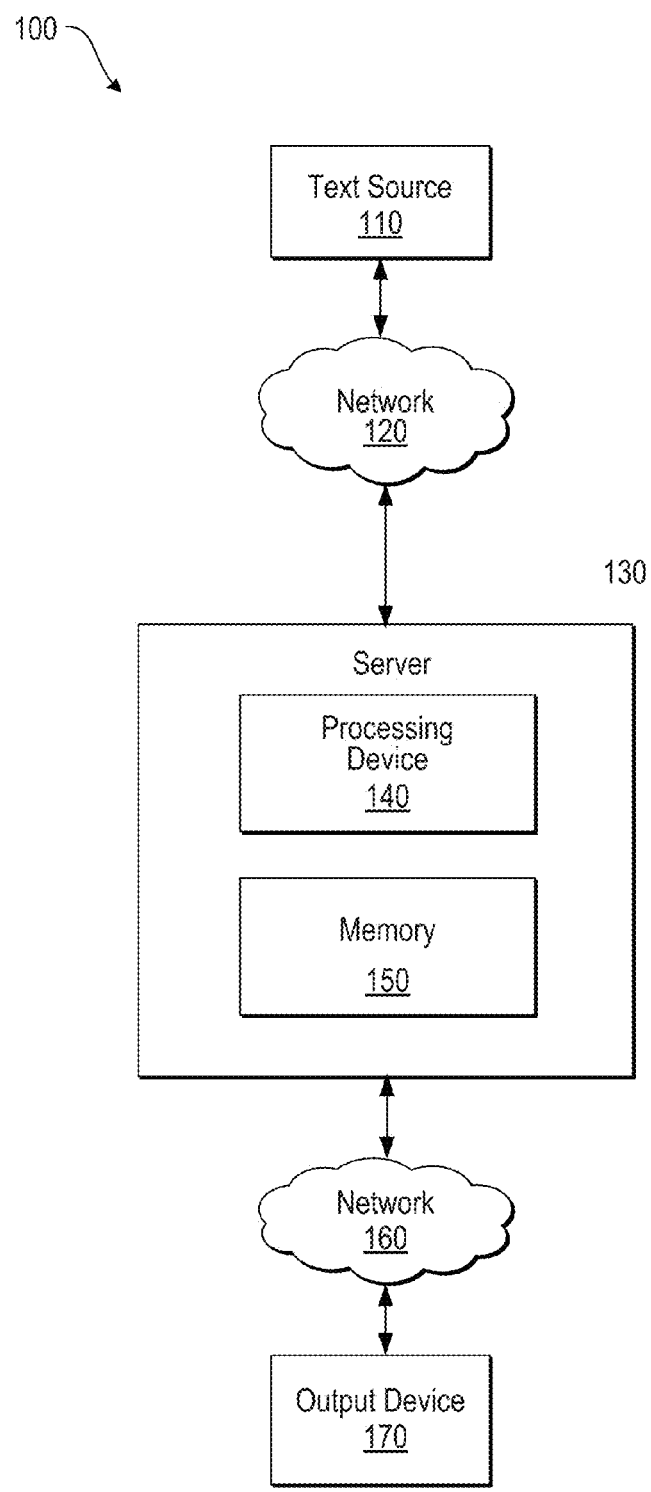
FIG. 1 depicts a system in accordance with an embodiment.

Various embodiments of the present disclosure are directed to a tool for visualizing user-generated content. More specifically, various embodiments are directed to a novel and previously unforeseen tool that produces an attribute cloud which efficiently and effectively enables a user to determine the semantic cohesion, relative significance, and/or sentiment of user-generated content.

As discussed above, companies and other similar entities have recently become interested in user-generated content (e.g., online opinion statements). Such companies commonly hire analyst teams to manually monitor online activity, and to extract insight into what is being said about their products and services, or what is being said about their competitor's products and services. This manual approach, however, is often ineffective and inefficient due to the volume of information available and the frequency at which such information is added. In many cases, by the time an opinion trend is manually identified and analyzed, too much time has passed to take effective measures. Hence, manual analysis is generally not the best solution for most companies.

An alternative approach is to utilize automated retrieval tools to "mine" or "scrape" the Internet and extract user-generated content. While such tools can automatically collect a vast amount of information, a common problem lies in how best to analyze and present the information such that a viewer can promptly comprehend the content and react thereto. One current approach is to create a "tag cloud" based on the harvested textual information, where a tag cloud is generally a visual representation of frequently used words in a single screen. While this approach allows for a viewer to quickly discern commonly used words with respect to a given source, such information is not too informative in most cases. That is, current tag clouds allow a viewer to discern information in a prompt manner, but the amount of information discernable from the tag clouds is usually not enough to make actionable business decisions.

Various embodiments of the present disclosure address at least the above by providing a tool that produces an attribute cloud which enables a viewer to intuitively and promptly understand a vast amount of information conveyed by the cloud. More precisely, various embodiments of the present disclosure provide a tool that visualizes a set of harvested attributes and conveys the relative significance, semantic cohesion, sentiment, and/or evolution in real-time via an attribute cloud. As discussed in detail below with reference to various example embodiments and example figures, this tool may effectively convey multi-dimensional information from a large set of attributes such that a viewer may make actionable business decisions based thereon.

In one example embodiment of the present disclosure, a system is provided. The system comprises at least one memory and at least one processing device. The at least one memory comprises instructions that when executed by the at least one processing device cause the system to receive a text corpus, filter the text corpus to obtain a plurality of attributes, determine the semantic cohesion between the plurality of attributes, and create an attribute cloud including the plurality of attributes, wherein the placement of the plurality of attributes within the attribute cloud is based at least in part on the determined semantic cohesion between the plurality of attributes. Additionally, further instructions cause the system to determine a sentiment for each of the plurality of attributes, and assign a color and color intensity to each of the plurality of attributes, wherein the assigned color and color intensity are based at least in part on the determined sentiment for each of the plurality of attributes. Still further instructions cause the system to determine an occurrence frequency for each of the plurality of attributes, and assign a text size to each of the plurality of attributes, wherein the assigned text size is based at least in part on the determined occurrence frequency for each of the plurality of attributes.

In another example embodiment of the present disclosure, a method is provided. The method comprises (i) receiving a text corpus via a computing device communications interface; (ii) filtering the text corpus to produce a plurality of attributes, wherein each of the plurality of attributes have an occurrence frequency above a threshold; (iii) determining the semantic cohesion between the plurality of attributes by analyzing the meaning of each of the plurality of attributes; (iv) creating an attribute cloud including the plurality of attributes, wherein the placement of the plurality of attributes within the attribute cloud is based at least in part on the determined semantic cohesion between the plurality of attributes; and (v) outputting the attribute cloud for display on a graphical user interface. The method further comprises creating metadata tags for each of the plurality of attributes in the attribute cloud, wherein the metadata tags are displayed in response to a selection of an attribute in the attribute cloud, or in response to locating a cursor above an attribute in the attribute cloud, and wherein the metadata tags comprise at least one of sentiment information, influencer information, source location information, and sample text information.

In still another embodiment of the present disclosure, a non-transitory computer-readable medium is provided. The non-transitory computer-readable medium comprises instructions that, when executed, cause a system to (i) receive a text corpus; (ii) filter the text corpus to obtain a plurality of attributes; (iii) filter the plurality of attributes to obtain the plurality of attributes above a frequency threshold; (iv) determine the semantic cohesion between the plurality of attributes above the frequency threshold; and (v) create an attribute cloud including the plurality of attributes above the frequency threshold, wherein the placement of the plurality of attributes above the frequency threshold within the attribute cloud is based at least in part on the determined semantic cohesion between the plurality of attributes above the frequency threshold FIG. 1 depicts a system 100 in accordance with an embodiment. It should be readily apparent that the system 100 represents a generalized illustration and that other components may be added or existing components may be removed, modified, or rearranged without departing from the scope of the system 100.

The system 100 comprises a text source 110, a first network 120, a server 130, a second network 160, and an output device 170. For the purposes of simplicity in illustration, the various system components are shown as separate devices. It should be understood, however, that one or more system components may be integrated with one another. For example, the server 130 may be integrated with the output device 170 into a single computing device, and the first network 120 and second network 180 may be the same network. Furthermore, it should be understood that while only one component is shown, there may be more than one of the same component. For example, while only one server 130 is shown, it should be understood that more than one server may be utilized, and only one is shown and described for ease of understanding.

The text source 110 is generally the resource that "provides" textual data. As used herein, "provides" is to be interpreted broadly to mean that the text source outputs such data and/or allows such data to be ingested (e.g., via a web crawl or other similar harvesting process). In one embodiment, this text source 110 may be one or more web servers that host a website (e.g., web server(s) that hosts Twitter or Facebook). In another embodiment, the text source 110 may be a database that stores text from, e.g., survey results, transcripts, documents, emails, archived data, forums, blogs, websites, speeches, or the like. In yet another embodiment, the text source 110 may be a storage medium that stores files and/or previously harvested textual data. For example, the storage medium may be a flash drive, hard drive, disk drive, CD-ROM, or the like with text stored thereon.

The text source 110 may provide the textual data directly or indirectly to the server 130. For example, the text source 110 may provide the textual data indirectly via network 120, or directly via a port connection. The text source 110 may also provide the textual data continuously, periodically, and/or on-demand. In some embodiments, the textual data is provided in real-time as the text is created. For example, the text source 110 may provide real time "Tweets" from Twitter users as they are added by users. Alternatively, the text source 110 may provide real time opinion text from product review sites as they are added by users.

The first network 120 and second network 160 may be typical communication networks that enable communication of data. For example, the first network 120 and second network 160 may one or more networks including, but not limited to, wired/wireless networks, local area networks (LANs), wide area network (WANs), telecommunication networks, the Internet, an Intranet, computer networks, Bluetooth networks, Ethernet LANs, token ring LANs, Inter-Integrated Circuit ($I^2C$) networks, serial advanced technology attachment (SATA) networks, and/or serial attached SCSI (SAS) networks. Such networks may utilize transmission mediums including, but not limited to, copper, fiber optics, coaxial, unshielded twisted pair, shielded twisted pair, heliax, radio frequency (RF), infrared (IR), and/or microwave.

The server 130 is generally one or more computing devices configured to retrieve, obtain, and/or ingest textual data from the text source 110 and process such data. The server(s) comprise one or more processing devices 140 (e.g., CPUs, microprocessors, microcontrollers, processors, etc.) and one or more memories 150 (e.g., RAM, ROM, cache, etc). Executable instructions stored on the one or more memories 150 may be executed by one or more processing devices 140 to conduct the various server functions described herein.

In some embodiments, the server 130 provides a "cloud" service, where features provided by the server 130 may be accessible by one or more remote computing devices via network connections. In other embodiments, the intention server 130 provides a "local" service, where a user's computing device comprises the server 130 and output device 170, and services provided by the server are accessible by the user's computing device.

The output device 170 is generally a device configured to receive and display information. In some embodiments, the output device 170 may comprise a display connected to the server 130. While in other embodiments, the output device 190 may comprise a computing device (e.g., a, laptop, desktop, tablet, and/or smartphone) connected to the server 130 via network 160.

Turning now to system 100 operations, as mentioned, the system 100 enables vast amounts of textual data to be processed and thereafter visualized in the form of an attribute cloud. This may be accomplished in some embodiments by utilizing content ingestion adapters within the server 130 to pull textual data from instances of one or more text sources (e.g., streaming data sources such as Twitter, frequently updated content sources such as review sites, and/or historical/stored content such as previously crawled data). Alternatively, such textual data may be uploaded or ingested in another manner. The textual data may then be processed by the server 130 in various manners to produce the attribute cloud (further detail described with respect to FIGS. 4 and 5). For example, the server 130 may filter the textual data (i.e., text corpus) to obtain a plurality of attributes to include in the attribute cloud. In some embodiments, this filtering may include identifying attributes of interest from the textual data based on parts of speech analysis. For example, the filtering may identify nouns and/or noun phrases in the text, and these nouns or noun phrases may be selected as attributes, or the nouns or noun phrases may be utilized to identify attributes people are discussing. Alternatively or in addition, the filtering may include identifying attributes of interest based on statistical characteristics of n-grams in the text. For example, the filtering may identify "n" words that have common or unusual occurrences in the textual data. Alternatively or in addition, the filtering may include identifying words and/or attributes above a numeric threshold, such that only frequently used words/attributes will be included in the attribute cloud.

In some embodiments, a combination of the above filtering techniques is utilized. For example, the textual data may first be filtered to identify all nouns in the text. The identified nouns may then be further filtered to remove nouns below a numeric threshold. Hence, the plurality of attributes output by the filtering process may only include nouns from the textual data above the numeric threshold. Alternatively, the textual data may first be filtered to identify all "n" words in the text. The identified "n" words may then be further filtered to remove the words below a numeric threshold. Hence, the plurality of attributes output by the filtering process may only include "n" words from the textual data above the numeric threshold.

After the filtering, the server 130 may proceed to determine the semantic cohesion, sentiment, and/or importance of the plurality of attributes. The semantic cohesion determination process may include determining the commonality between the attribute meanings. The sentiment determination process may include determining if the attribute sentiment is positive, negative, or neutral sentiment. The importance determination process may include determining the frequency of each attribute.

Thereafter, the server 130 may create and make accessible an attribute cloud including the plurality of attributes. The placement of the plurality of attributes within the attribute cloud may be based on the determined semantic cohesion between the plurality of attributes (e.g., attributes with strong semantic cohesion may be placed closer to one another within the attribute cloud). In addition, the color and color shade of the plurality of attributes may be based on the determined sentiment of each attribute (e.g., highly positive=dark green; positive=green; highly negative=dark red; negative=red; neutral=gray; mixed=yellow). Furthermore, the size of the text within the attribute cloud may be based on the determined importance (e.g., high importance=large text; low importance=small text). The attribute cloud may then evolve or dynamically change based on real time or near real time input.

Figure 2:
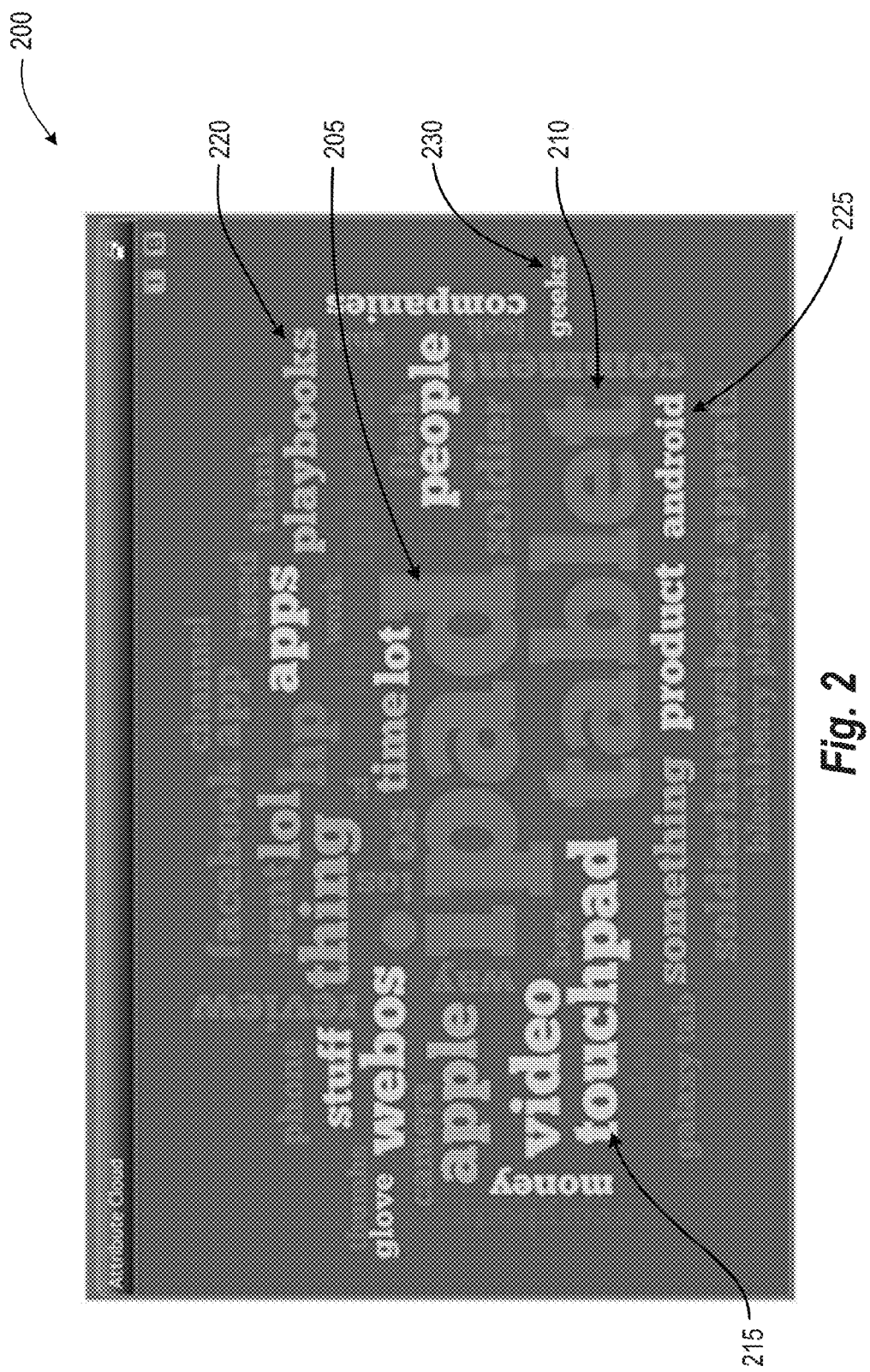
FIG. 2 depicts an example attribute cloud in accordance with an embodiment.
Figure 3:
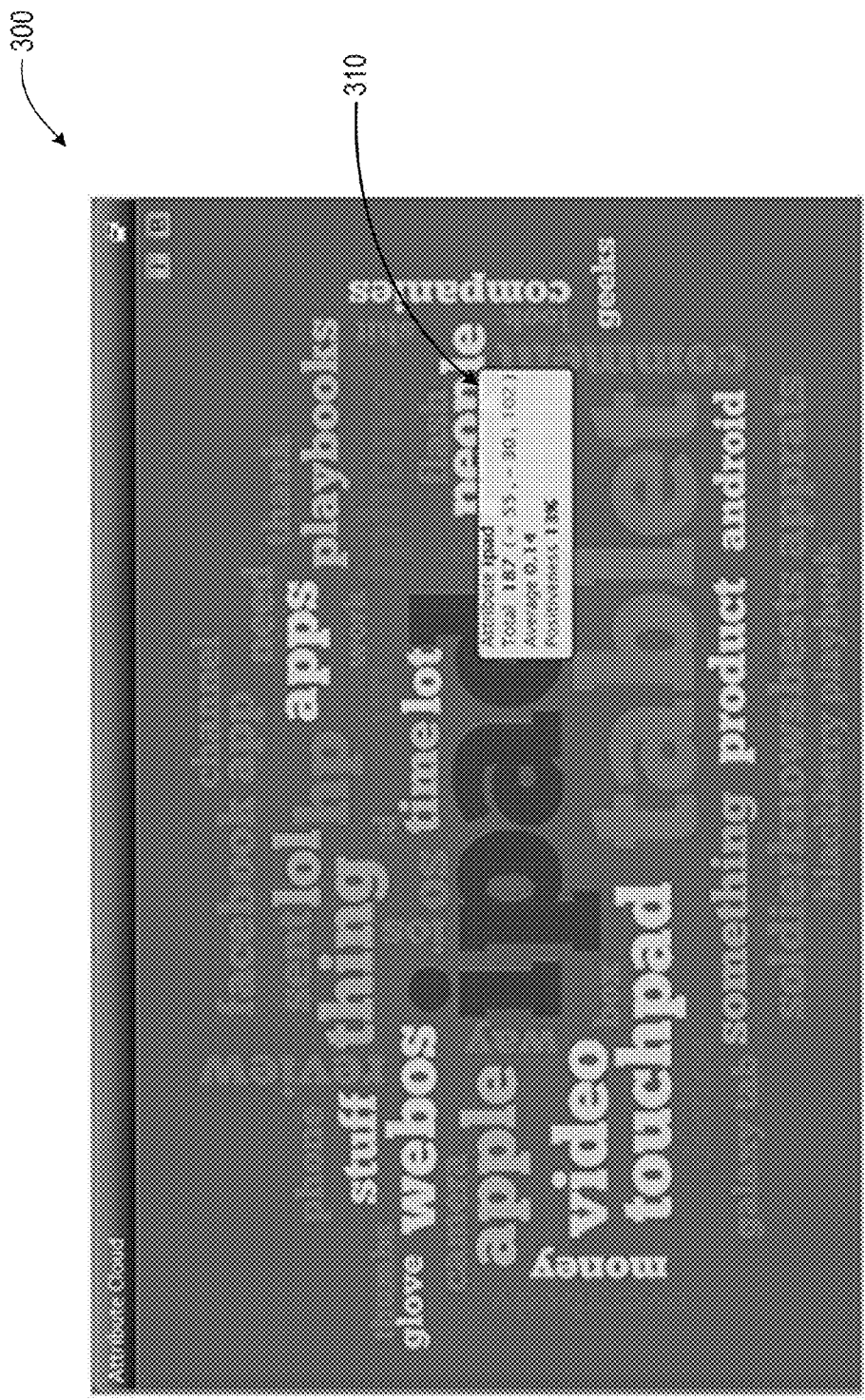
FIG. 3 depicts an example attribute cloud with metadata in accordance with embodiment.
Figure 4:
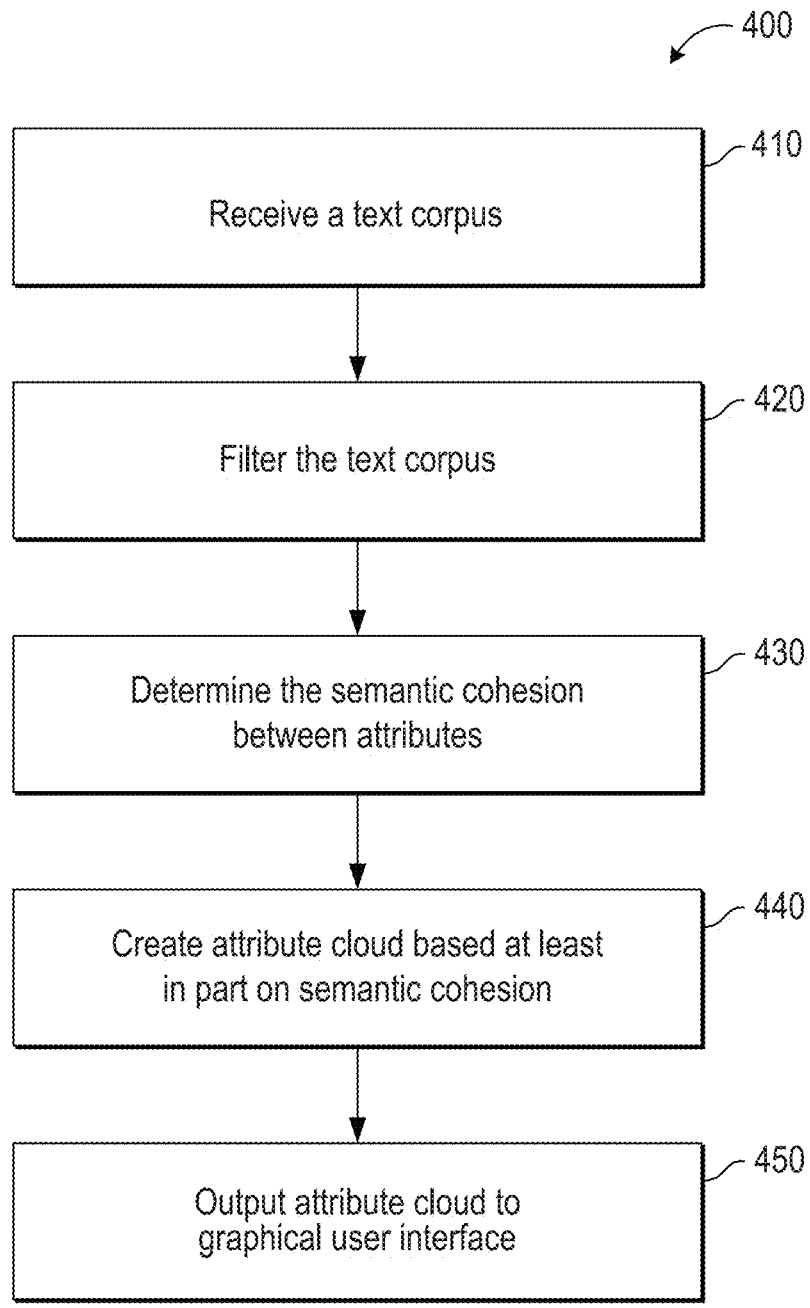
FIG. 4 depicts an example method associated with producing an attribute cloud in accordance with embodiment.
Figure 5:
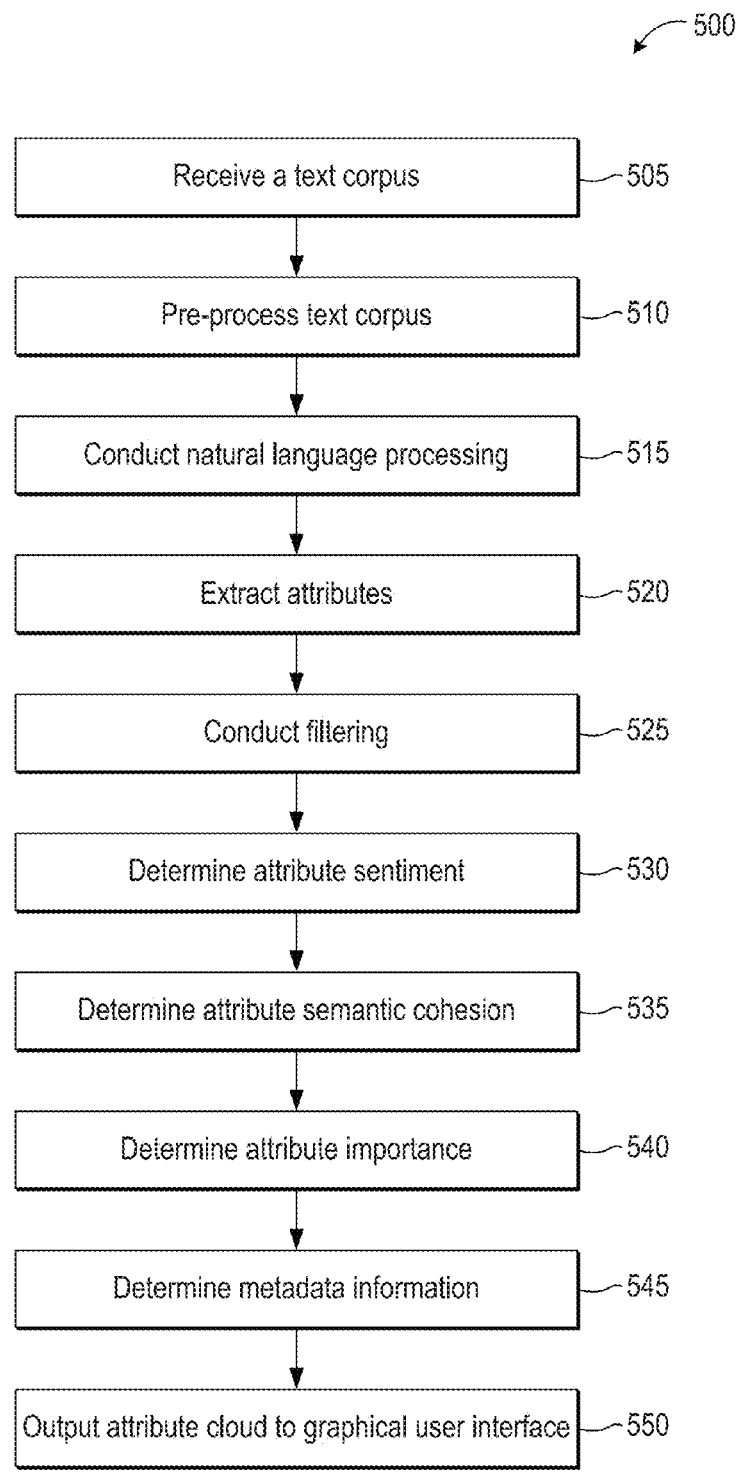
FIG. 5 depicts an example method associated with producing an attribute cloud in accordance with another embodiment.

The above mentioned processes and attribute cloud are discussed in greater detail with respect to FIGS. 2-5, where FIGS. 2 and 3 provide an example attribute cloud, and FIGS. 4 and 5 explain the server processing in further detail.

FIG. 2 depicts an example attribute cloud 200 in accordance with an embodiment. In particular, FIG. 2 depicts an example attribute cloud 200 produced by the server 130 based on Twitter feeds provided by the text source 110.

The attribute cloud 200 includes various innovative features. One such feature is that the attribute cloud 200 conveys semantic cohesion. In particular, the server 130 places attributes that belong to the same semantic categories and/or that are synonyms close to one another (e.g., in a cluster). Thus, the semantic distance between the attributes may work as a constraint for the attribute placement. For example and referring to the attributes in FIG. 2, the "ipad" 205, "tablet" 210, and "touchpad" 210 are placed very close to one another because these attributes are all related to tablet-type computers.

Another feature of the attribute cloud 200 is that it conveys sentiment information. In particular, the color and shade of the attributes in the cloud may be a function of their sentiment values. In the example shown in FIG. 2, positive sentiments are shown in green, with the degree of positiveness shown with different shades of green. Similarly, negative sentiments are shown in red, with the degree of negativity shades of green. For example, the attribute "ipad" 205 is shown in dark green because processing of the Twitter sample text indicated that many positive comments were made about the iPad device. By contrast, "iphone" 220 is shown is dark red because processing of the Twitter sample text indicated that many negative comments were made about the iPhone device. If the processing reveals that there are positive and negative sentiments, another color may be used to indicate mixed results. For example, "android" 225 is shown in yellow because the processing of the Twitter sample text indicated that both positive and negative comments were made about the Android operating system. If the processing reveals that there are neutral sentiments, a further color may be used to indicate mixed results. For example, the attribute "geeks" is shown in gray because processing of the Twitter sample text indicated that sentiment neutral comments were made about the attribute "geeks."

A further feature of the attribute cloud 200 is that it conveys the relative importance of the attributes. More specifically, the size of the attributes in the attribute cloud 200 may be a function of the attributes relative frequency among the sample. For example, the attribute "ipad" 205 may appear in larger font than the term "android" 225 because the processing reveals that "ipad" is mentioned more times than the term "android." In some embodiments, a non-linear function may be used to map the attribute frequency to the attribute size, where the size of the attributes is constrained by the available space on the graphical user interface (GUI) canvas, and the goal is to maximize utilization of the canvas. Furthermore, in some embodiments, the orientation of the attributes in the cloud (e.g., horizontal, vertical, and diagonal) may be determined based on aesthetics and maximum space utilization considerations. In other embodiments, the orientation may be used to convey information such as trending momentum (e.g., the attributes mentioned most recently are horizontal) or other informative information.

A still further feature of the attribute cloud 200 is that it may evolve in real time. In particular, the server 130 may be configured to receive real-time feeds from the text source 110 and update the attribute cloud 200 based on the input. Thus, the attribute cloud 200 may evolve according to the dynamic changes that occur in the attribute importance, attribute sentiment, and/or attribute semantic cohesion. This, in turn, may impact attribute font size, placement, and/or color.

A yet further feature of the attribute cloud 200 is that metadata may be associated with the attribute cloud 200, and such data may be accessible to the viewer to obtain further relevant information. FIG. 3 illustrates an example attribute cloud 300 with metadata 310 in accordance with embodiment. Each attribute may be associated with metadata that is accessible by, e.g., clicking on the attribute and/or locating a cursor above an attribute. A shown, the metadata may display attribute information such as the name of the attribute (e.g., "ipad"), the total number of mentions (e.g., "ipad" was mentioned 187 times in the Twitter feeds), the number of positive sentiments (e.g., "ipad" was mentioned positively 55 times), the number of negative sentiments (e.g., "ipad" was mentioned negatively 30 times), the number of neutral sentiments (e.g., "ipad" was mentioned neutrally 102 times), an average score (e.g., a composite score based on the positive, negative, and neutral mentions), and/or a positiveness score (e.g., a composite score based on the positive mentions). In addition, the metadata may display other information such as the geographical makeup of the source text information (e.g., 55% U.S., 25% Canada, and 10% UK) and sample text information (e.g., sample text from one or more sentences mentioning the selected attribute). Still further, the metadata may include influencer information, which indicates the level of influence one or more authors carries. For example, a statement from the president or a CEO may have a higher influencer score than a common person. Similarly, a statement from a person with a large following (e.g., a person with a high number of Twitter followers) may have a higher influencer score than a person with a small following. This influencer information may be obtained, for example, by analysis of an author's Twitter profile and/or number of followers.

FIG. 4 depicts an example method 400 associated with producing the above-described attribute cloud in accordance with an embodiment. The illustrated elements denote "processing blocks" that may be implemented in logic. In one example, the processing blocks may represent executable instructions that cause a computer, processor, and/or logic device to respond, to perform an action(s), to change states, and/or to make decisions. Thus, described methodologies may be implemented as processor executable instructions and/or operations provided by a computer-readable medium. In another example, processing blocks may represent functions and/or actions performed by functionally equivalent circuits like an analog circuit, a digital signal processor circuit, an application specific integrated circuit (ASIC), or other logic device. FIG. 4, as well as the other figures, is not intended to limit the implementation of the described examples. Rather, the figures illustrate functional information one skilled in the art could use to design/fabricate circuits, generate software, or use a combination of hardware and software to perform the illustrated processing.

The method 400 may begin at block 410, where the server 130 receives a text corpus from a text source 110 via a communications interface. For example, the server 130 may receive a Twitter feed from a web server via a network interface card installed on the sever 130 and/or via adapters on the server.

At block 420, the server 130 filters the text corpus to produce a plurality of attributes, where each of the plurality of attributes has an occurrence frequency above a threshold. For example, the server 130 may filter the text corpus to produce only those attributes that were mentioned at least 20 times. As mentioned above, this filtering may also or alternatively include filtering based on the parts of speech and/or filtering based on identified n-grams. For example, the textual data may first be filtered to identify all nouns in the text. The identified nouns may then be further filtered to remove nouns below a numeric threshold. Consequently, the plurality of attributes output by the filtering process may only include nouns from the textual data above the numeric threshold. Alternatively, the textual data may first be filtered to identify all "n" words in the text. The identified "n" words may then be further filtered to remove the words below a numeric threshold. Thus, the plurality of attributes output by the filtering process may only include "n" words from the textual data above the numeric threshold.

At block 430, the server 130 determines the semantic cohesion between the plurality of attributes. This maybe accomplished, for example, by the server 130 analyzing the meaning of each of the plurality of attributes, and assigning a semantic cohesion score to a plurality of attributes pairs. More particularly, the server 130 may obtain the meanings of each of the attributes and compare the meanings to determine if any of the attributes have common meanings and/or are synonymous with one another.

At block 440, the server creates an attribute cloud including the plurality of attributes, where the placement of the plurality of attributes within the attribute cloud is based at least in part on the determined semantic cohesion between the plurality of attributes. For example, and as mentioned above, attributes with high semantic cohesion (e.g., "tablet," "ipad," and "touchpad") may be placed close to one another.

At block 450, the server 130 outputs the attribute cloud for display on a graphical user interface. For example, the server 130 may output the attribute cloud for display on one or more computing/output devices such as desktops, laptops, tablet, and/or smartphones. Alternatively or in addition, the server 130 may output the attribute cloud for display on an attached output device such as a monitor.

FIG. 5 depicts an example method 500 associated with producing the above-described attribute cloud in accordance with an embodiment. Similar to FIG. 4, it should be understood that the processes may be conducted in a different order than shown.

The method may begin at block 505 where the server 130 receives a text corpus from a text source 110 via a communications interface. For example, the server 130 may receive a Twitter feed from a web server via a network interface card installed on the sever 130 and/or via harvesting adapters installed on the server.

At block 510, the server 130 pre-processes the text corpus to make the data more amenable for analysis. For example, such pre-processing may include removing spam text, removing duplicate text, restoring popular abbreviations to their corresponding original form, and/or removing extra text such as hyperlinks and user names.

At block 515, server 130 conducts natural language processing (NLP) on the text corpus. Such NLP may include splitting text into sentences, splitting sentences into appropriate tokens, tagging sentences with their part-of-speech, identifying sentence type, and/or resolving co-references. Sentence detection may be accomplished by identifying a sentence boundary annotator and/or by identifying punctuation marks. Sentence-type detection may be accomplished by determining if a sentence is a declarative sentence, imperative sentence, interrogative sentence, comparative sentence, or non-comparative sentence via pattern matching rules. For example, an interrogative sentence may be identified by the following pattern: [model word]+[auxiliary verb]+[words window]+[question mark].

At block 520, the server 130 conducts attribute extraction, since sentiments are expressed not just on entities, but at a finer granularity on attributes of entities. For example, the sentence—"The picture of the TV is awesome"—expresses a positive sentiment on the picture attribute of the TV entity. Discovering the sentiment may involve identifying nouns (e.g., "picture") and associated opinion/sentiment words (e.g., "awesome").

At block 525, the server 130 filters the attributes to, e.g., remove attributes below a numeric threshold, identify particular parts of speech, and/or identify n-grams. For example, the server 130 may identify all nouns and filter the nouns to remove those mentioned 15 times or less.

At block 530, the server 130 determines the sentiment (e.g., positive, negative, or neutral) for the remaining attributes. This may be accomplished via opinion lexicon-based approach, where domain specific lexicons are used to identify particular opinion words, and based on the relation identified sentiment polarity can be determined for the attribute directly. If no clear dependency relation exists, either the opinion word closest to the attribute or the opinion words within a window of a given size may be used to compute the attribute sentiment.

At block 535, the server 130 determines the semantic cohesion among the attributes. This may involve determining the meaning and/or synonyms of each attribute, and assigning a semantic cohesion score to two or more attributes. For example, the attributes "ipad" and "tablet" may produce a high semantic cohesion score because the two attributes similarly refer to tablet computing devices. On the other hand, the terms "tablet" and "shoe" may produce a how semantic cohesion score because the two attributes do not have similar meanings and are not synonymous with one another.

At block 540, the server 130 may determine the importance of each attribute. As mentioned, this may accomplished by assigning a font size that is a non-linear function of the frequency of the attribute.

At block 545, the server 130 may determine metadata information for each attribute. As mentioned, the metadata information may include attribute information such as the name of the attribute (e.g., "ipad"), the total number of hits (e.g., "ipad" was mentioned 187 times in the Twitter feeds), the number of positive sentiments (e.g., "ipad" was mentioned positively 55 times), the number of negative sentiments (e.g., "ipad" was mentioned negatively 30 times), the number of neutral sentiments (e.g., "ipad" was mentioned neutrally 102 times), an average score (e.g., a composite score based on the positive, negative, and neutral mentions), a positiveness score (e.g., a composite score based on the positive mentions), the geographical makeup of the source text information (e.g., 55% U.S., 25% Canada, and 10% UK), sample text information (e.g., sample text from one or more sentences mentioning the selected attribute), and/or influencer information.

At block 550, the server 130 may output the attribute cloud for display on a graphical user interface. For example, the server 130 may output the attribute cloud for display on one or more computing/output devices such as desktops, laptops, tablet, and/or smartphones. Alternatively or in addition, the server 130 may output the attribute cloud for display on an attached output device such as a monitor.

Figure 6:
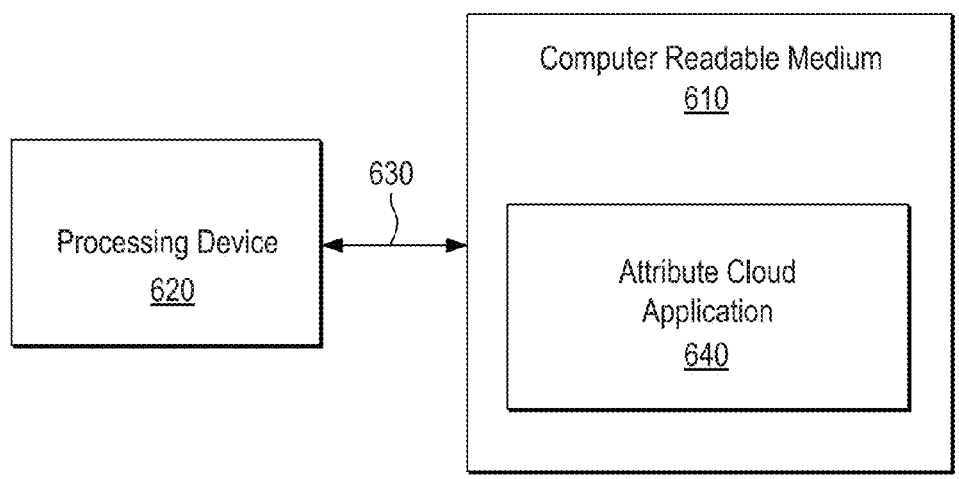
FIG. 6 depicts a non-transitory computer-readable medium in accordance with an embodiment.

FIG. 6 depicts a non-transitory computer-readable medium that stores instructions for operating an intention server in accordance with various embodiments. The non-transitory computer-readable medium is generally referenced by reference number 610 and may be included in the server 130. The non-transitory computer-readable medium 610 may correspond to any typical storage device that stores computer-implemented instructions, such as programming code or the like. For example, the non-transitory computer-readable medium 610 may include one or more of a non-volatile memory, a volatile memory, and/or a storage device. Examples of non-volatile memory include, but are not limited to, electronically erasable programmable read only memory (EEPROM) and read only memory (ROM). Examples of volatile memory include, but are not limited to, static random access memory (SRAM) and dynamic random access memory (DRAM). Examples of storage devices include, but are not limited to, hard disk drives, compact disc drives, digital versatile disc drives, optical devices, and flash memory devices. In some embodiments, the instructions may be part of an installation package that can be executed by a computing device. In this case, the non-transitory computer-readable medium 610 may be a portable medium such as a CD, DVD, or flash drive or a memory maintained by a server from which the installation package can be downloaded and installed. In another embodiment, the instructions may be part of an application or application already installed. Here, the non-transitory computer-readable medium 610 can include integrated memory such as a hard drive.

A processing device 620 generally retrieves and executes the instructions stored in the non-transitory computer readable medium 610. In an embodiment, the non-transitory computer readable medium 610 may be accessed by the processing device 620 over a bus 630. A region 640 of the non-transitory computer readable medium 610 may include an attribute cloud application comprising instructions for the attribute processing functionality described above.

The present disclosure has been shown and described with reference to the foregoing exemplary embodiments. It is to be understood, however, that other forms, details, and embodiments may be made without departing from the spirit and scope of the disclosure that is defined in the following claims.

What is claimed is:

1. A system comprising:
   at least one non-transitory storage medium; and
   at least one processing device, wherein the at least one non-transitory storage medium comprises instructions that when executed by the at least one processing device cause the system to:
   receive a text corpus;
   filter the text corpus to obtain a plurality of attributes;
   determine a semantic cohesion between the plurality of attributes; and
   create an attribute cloud including the plurality of attributes, wherein placement of the plurality of attributes within the attribute cloud is based at least in part on the determined semantic cohesion between the plurality of attributes, wherein sizes of respective attributes of the plurality of attributes of the attribute cloud vary according to relative importance of the plurality of attributes, and wherein visual indicators assigned to the respective attributes of the plurality of attributes vary according to user sentiments expressed for the plurality of attributes; and
   generate a visual representation of the attribute cloud for display, the plurality of attributes in the visual representation of the attribute cloud having the placement, the sizes, and the visual indicators.

2. The system of claim 1, wherein attributes of the plurality of attributes with higher semantic cohesion are placed closer to one another in the attribute cloud.

3. The system of claim 1, wherein the instructions when executed cause the system to determine the semantic cohesion between the plurality of attributes by comparing meanings of the plurality of attributes.

4. The system of claim 1, wherein each of the plurality of attributes in the attribute cloud is associated with metadata.

5. The system of claim 4, wherein the metadata comprises at least one of sentiment information, influencer information, source location information, and sample text information.

6. The system of claim 1, wherein the instructions when executed cause the system to display metadata information in response to a selection of an attribute of the plurality of attributes in the visual representation of the attribute cloud, or in response to locating a cursor above an attribute of the plurality of attributes in the visual representation of the attribute cloud.

7. The system of claim 1, wherein the instructions when executed cause the system to:
   determine an occurrence frequency for each respective attribute of the plurality of attributes; and
   assign a text size to each respective attribute of the plurality of attributes, wherein the assigned text size is based at least in part on the determined occurrence frequency for the respective attribute of the plurality of attributes.

8. The system of claim 1, wherein the instructions when executed cause the system to update the attribute cloud based on continued or periodic receipt of further text.

9. The system of claim 1, where the assigned visual indicators comprise colors assigned to the plurality of attributes.

10. A system comprising:
    at least one non-transitory storage medium; and at least one processing device, wherein the at least one non-transitory storage medium comprises instructions that when executed by the at least one processing device cause the system to:
receive a text corpus;
filter the text corpus to obtain a plurality of attributes;
determine a semantic cohesion between the plurality of attributes;
create an attribute cloud including the plurality of attributes, wherein placement of the plurality of attributes within the attribute cloud is based at least in part on the determined semantic cohesion between the plurality of attributes;
determine a sentiment for each respective attribute of the plurality of attributes; and
assign a color and a color intensity to each respective attribute of the plurality of attributes, wherein the assigned color and color intensity are based at least in part on the determined sentiment for the respective attribute of the plurality of attributes.

11. A non-transitory computer-readable medium comprising instructions that when executed cause a system to:
receive a text corpus;
filter the text corpus to obtain a plurality of attributes;
determine a semantic cohesion between the plurality of attributes;
create an attribute cloud including the plurality of attributes, wherein placement of the plurality of attributes within the attribute cloud is based at least in part on the determined semantic cohesion between the plurality of attributes;
determine a sentiment for each respective attribute of the plurality of attributes; and
assign a color and a color intensity to each respective attribute of the plurality of attributes, wherein the assigned color and color intensity are based at least in part on the determined sentiment for the respective attribute of the plurality of attributes.

12. The non-transitory computer-readable medium of claim 11, wherein attributes of the plurality of attributes with higher semantic cohesion are placed closer to one another in the attribute cloud.

13. The non-transitory computer-readable medium of claim 11, wherein the instructions, when executed, cause the system to determine the semantic cohesion between the plurality of attributes by obtaining and comparing meanings of the plurality of attributes.

14. The non-transitory computer-readable medium of claim 11, wherein each of the plurality of attributes in the attribute cloud is associated with metadata, and the metadata comprises at least one of sentiment information, influencer information, source location information, and sample text information.

15. The non-transitory computer-readable medium of claim 14, wherein the metadata is displayed in response to a selection of an attribute in the attribute cloud, or in response to locating a cursor above an attribute in the attribute cloud.

16. A method comprising:
receiving a text corpus via a computing device communications interface;
filtering, by a system including a processor, the text corpus to produce a plurality of attributes, wherein each of the plurality of attributes has an occurrence frequency above a threshold;
determining, by the system, a semantic cohesion between the plurality of attributes by analyzing a meaning of each of the plurality of attributes;
creating, by the system, an attribute cloud including the plurality of attributes, wherein placement of the plurality of attributes within the attribute cloud is based at least in part on the determined semantic cohesion between the plurality of attributes;
assigning, by the system, a text size to each respective attribute of the plurality of attributes, wherein the assigned text size is based at least in part on the occurrence frequency for the respective attribute of the plurality of attributes; and
outputting, by the system, the attribute cloud for display on a graphical user interface.

17. The method of claim 16, wherein analyzing the meaning of each of the plurality of attributes comprises determining an amount of commonality between the meanings of the plurality of attributes.

18. The method of claim 16, wherein attributes of the plurality of attributes with higher semantic cohesion are placed closer to one another within the attribute cloud than attributes with lower semantic cohesion.

19. The method claim 16, further comprising creating metadata tags for each of the plurality of attributes in the attribute cloud, wherein the metadata tags are displayed in response to a selection of an attribute in the attribute cloud, or in response to locating a cursor above an attribute in the attribute cloud.

20. The method of claim 19, wherein the metadata tags comprise at least one of sentiment information, influencer information, source location information, and sample text information.

* * * * *

UNITED STATES PATENT AND TRADEMARK OFFICE
CERTIFICATE OF CORRECTION

PATENT NO. : 9,064,009 B2  
APPLICATION NO. : 13/432639  
DATED : June 23, 2015  
INVENTOR(S) : Riddhiman Ghosh et al.

Page 1 of 1

It is certified that error appears in the above-identified patent and that said Letters Patent is hereby corrected as shown below:

Drawings

In sheet 6 of 6, reference numeral 610, line 1, delete "Computer Readable" and insert -- Computer-Readable --, therefor.

Claims

In column 12, line 39 approx., in Claim 19, delete "The method claim" and insert -- The method of claim --, therefor.

Signed and Sealed this  
Twenty-second Day of March, 2016

Michelle K. Lee  
*Director of the United States Patent and Trademark Office*